United States Patent [19]

Yamamoto

[11] 4,109,115

[45] Aug. 22, 1978

[54] MAGNETIC RECORDING APPARATUS WITH A PLURALITY OF SIGNAL RECEIVING DEVICES

[75] Inventor: Harunori Yamamoto, Tokyo, Japan

[73] Assignee: Sony Corporation, Tokyo, Japan

[21] Appl. No.: 607,955

[22] Filed: Aug. 26, 1975

[30] Foreign Application Priority Data

Aug. 29, 1974 [JP] Japan ................................ 49-99228
Aug. 29, 1974 [JP] Japan ................................ 49-99230

[51] Int. Cl.² ............................................. G11B 31/00
[52] U.S. Cl. ................................. 179/100.11; 360/61; 360/94
[58] Field of Search ...................... 179/100.11; 360/61, 360/94

[56] References Cited

U.S. PATENT DOCUMENTS

| | | | |
|---|---|---|---|
| 3,018,330 | 1/1962 | Soja | 179/100.11 |
| 3,612,777 | 10/1971 | Ban | 179/100.11 |
| 3,784,762 | 1/1974 | Seregni | 179/100.11 |
| 3,899,795 | 8/1975 | Watanabe | 179/100.11 |
| 4,031,334 | 6/1977 | Kimura | 340/147 LP |

Primary Examiner—Harold I. Pitts
Attorney, Agent, or Firm—Lewis H. Eslinger; Alvin Sinderbrand

[57] ABSTRACT

Apparatus that includes a magnetic tape recorder is also provided with FM and AM radio signal tuners and a TV audio signal tuner. The signals received by any of these tuners can be either recorded or monitored independently. However, when an FM signal is being recorded in the magnetic tape recorder, the apparatus is so constructed that a TV signal cannot be monitored by the TV signal tuner. Conversely, when a TV signal is being recorded, the FM tuner cannot monitor an FM signal. When an AM signal is being recorded, either an FM or a TV signal can be monitored and, conversely, when either an FM or a TV signal is being recorded, an AM signal can be monitored.

25 Claims, 14 Drawing Figures

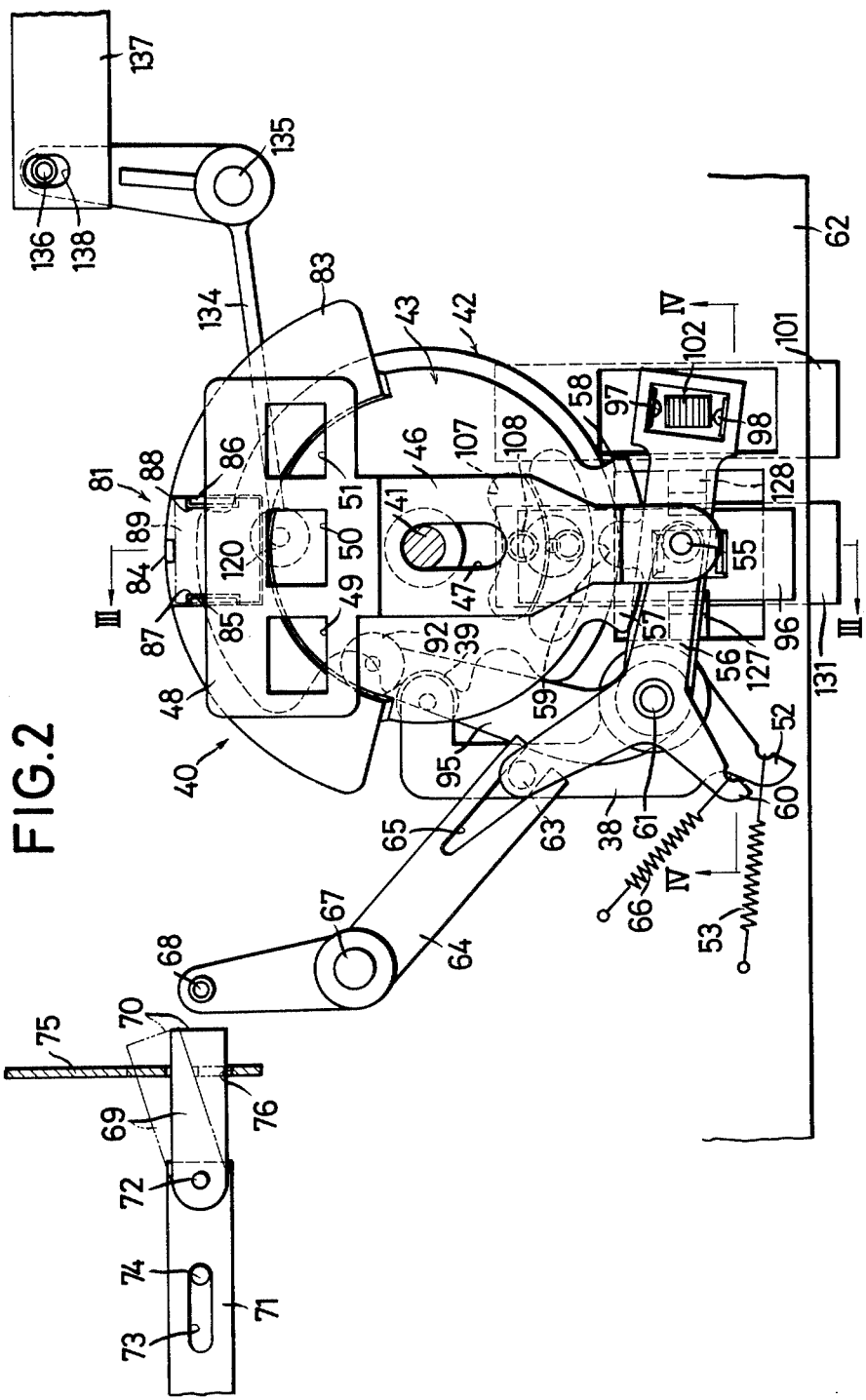

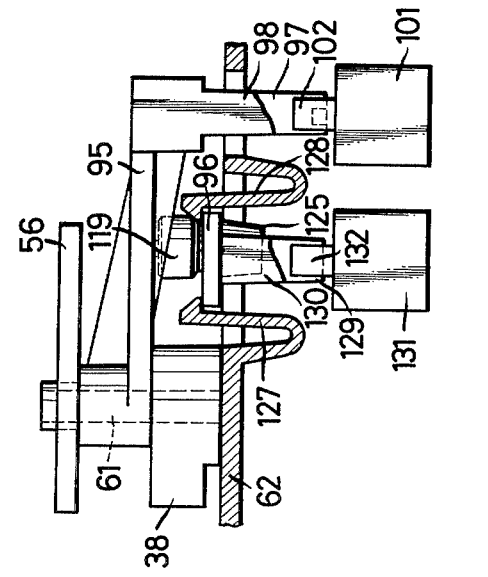
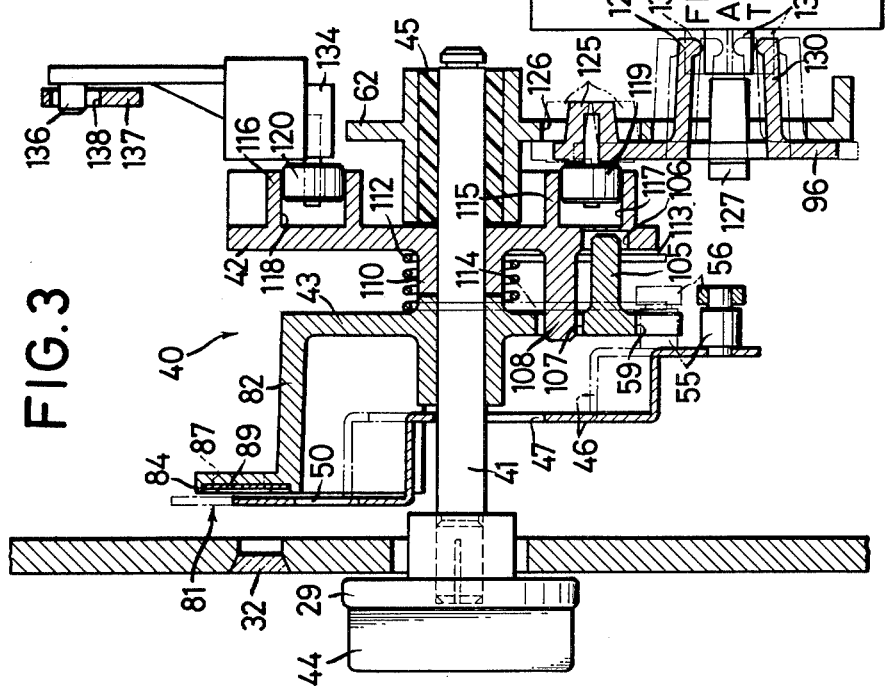

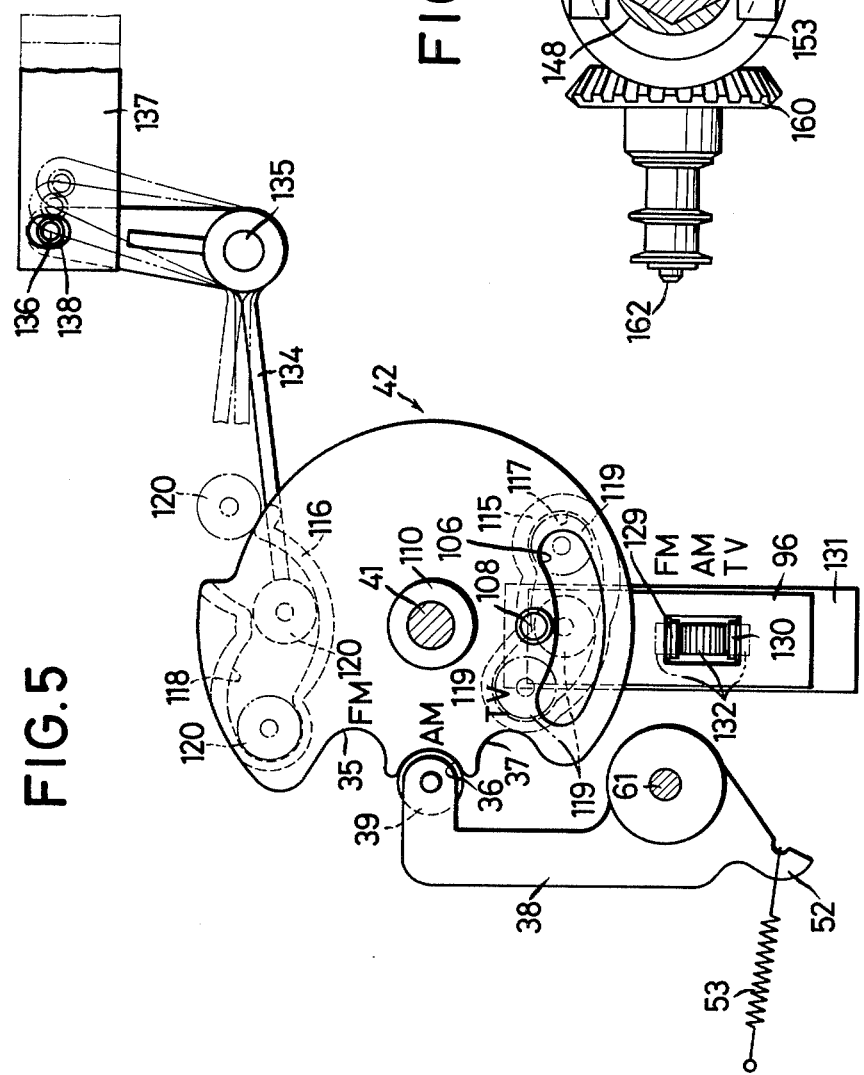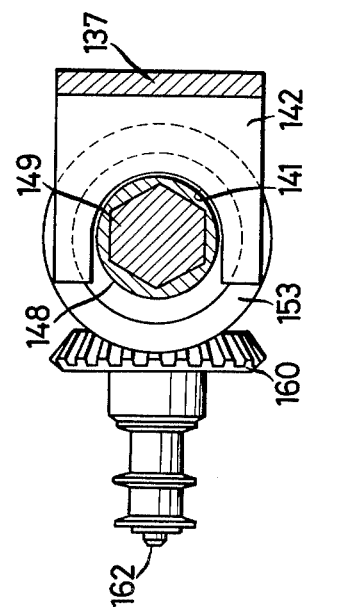

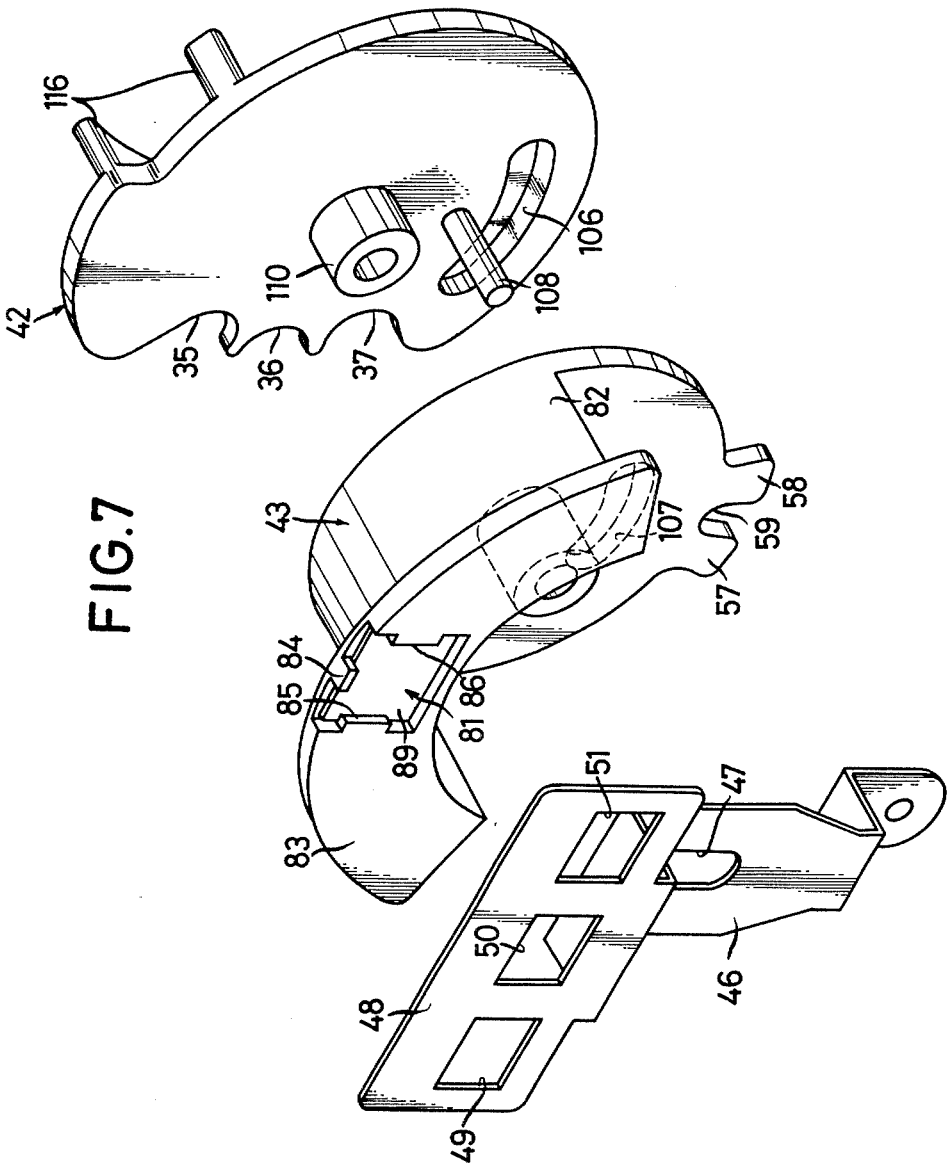

MAGNETIC RECORDING APPARATUS WITH A PLURALITY OF SIGNAL RECEIVING DEVICES

BACKGROUND OF THE INVENTION

1. Field of the Invention

This invention relates to apparatus that includes a magnetic recording section and a radio signal receiving section. In particular it relates to apparatus that includes means for receiving signals on the AM and FM bands and at least the audio signal portion of the television (TV) signal band, the apparatus being so arranged that signals from one band can be recorded at the same time that a person using the apparatus is listening to signals from another band.

2. The Prior Art

There is existing apparatus that includes a magnetic tape recorder and a receiver section with AM and FM radio receivers and a TV audio signal receiver. Combined recording and receiving apparatus may also include a magnetic video tape recorder with two television tuners such as a UHF and a VHF tuner. In apparatus of the foregoing type, it is possible to record the output signal from one of the receivers while listening to a signal being received in another of the receivers.

There is presently a proposed apparatus that includes a magnetic recording section and at least three signal receiving devices, such as AM, FM and TV tuners, and in which a signal from one of the tuners can be recorded while another signal is being monitored. However, in such apparatus, if the signal from the FM tuner is being recorded while the signal from the TV tuner is being monitored, or listened to, a beat signal may be produced between the FM carrier signal and the TV audio carrier signal. A beat signal may also be produced in the converse operation in which a signal from the TV tuner is being recorded while a signal from the FM tuner is being monitored. In either of these cases, the beat signal will be included in the signal being monitored and in the signal being recorded so that the quality of the reproduced sound, either that being monitored by being listened to directly or that being recorded to be listened to later, will be adversely affected and its quality deteriorated.

SUMMARY OF THE INVENTION

It is one of the objects of this invention to provide apparatus that includes a magnetic recording section and a signal receiving section and overcomes the above-described defect.

Another object of this invention is to provide combined magnetic recording and signal receiving apparatus in which one received signal may be recorded while another received signal is being monitored without the creation of interference between the two.

A further object of this invention is to provide combined magnetic recording and signal receiving apparatus that includes at least three signal receiving devices and in which the received signal from one of these devices cannot be recorded (or monitored) while the received signal from a specific second one of the devices is being monitored (or recorded).

In accordance with one aspect of this invention, apparatus is provided that includes a magnetic recording section and a receiving section capable of receiving signals by means of three devices and further including the necessary circuitry to permit any of the received signals to be recorded or monitored independently. The apparatus is constructed so that when a first received signal is being recorded, a specific second received signal cannot simultaneously be monitored, and vice versa.

The above and other objects, features, and advantages of this invention will become apparent from the following detailed description of illustrative embodiments shown in the accompanying drawings.

BRIEF DESCRIPTION OF THE DRAWINGS

FIG. 2 is a front elevational view of one embodiment of band selecting mechanism in the apparatus of FIG. 1.

FIG. 3 is a cross-sectional view of part of the apparatus of FIG. 2 taken along the line III—III in FIG. 2.

FIG. 4 is a cross-sectional view of part of the apparatus in FIG. 2 along the line IV—IV in FIG. 2.

FIG. 5 is a front elevational view of the main cam and certain associated components of the apparatus in FIG. 2.

FIG. 7 is an enlarged exploded view of several of the main parts of the band selecting mechanism of FIG. 2.

FIG. 11 is a cross-sectional view of part of the apparatus of FIG. 9 along the line XI—XI in FIG. 9.

DESCRIPTION OF THE PREFERRED EMBODIMENTS

Figure 1:
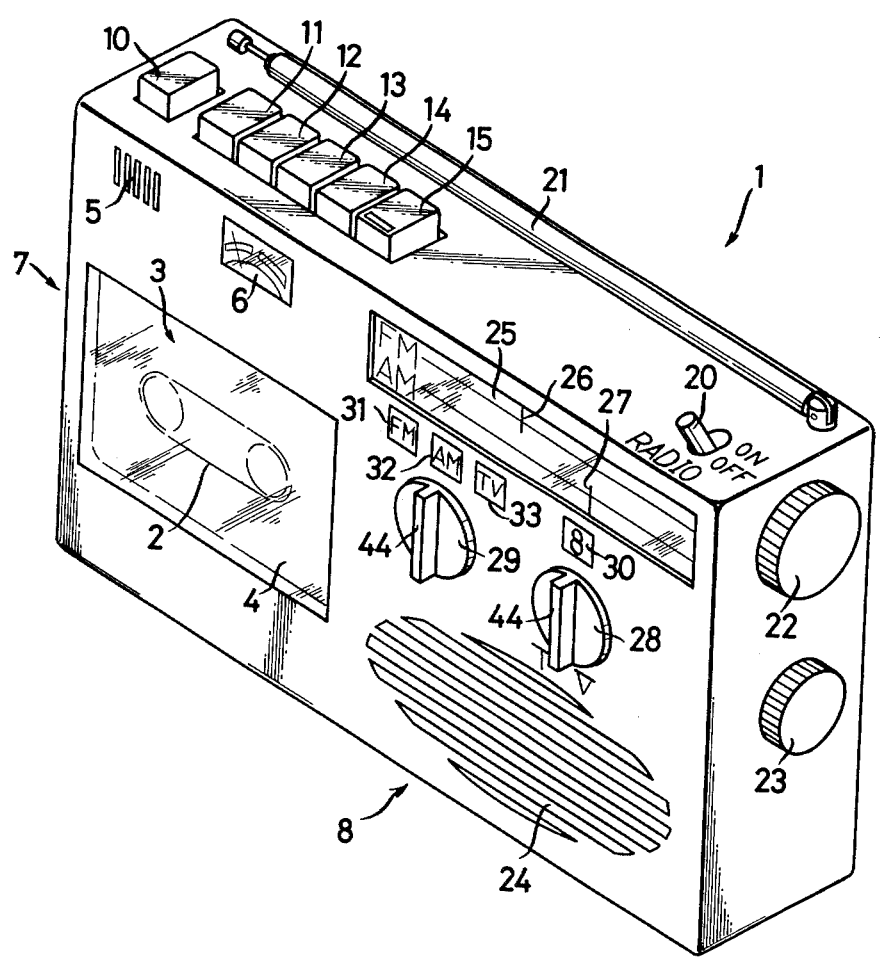
FIG. 1 is a perspective view of a magnetic tape recorder with AM and FM radio signal receivers and a TV audio signal receiver interconnected according to this invention.

FIG. 1 shows a combined tape recorder and receiver apparatus 1 and includes a cassette 2 in a holder 3 having a cover 4. The combined apparatus 1 also includes a microphone 5 so that direct recording may be made on the tape in the cassette. A meter 6 is provided to set the operating level of the signals, and all of the foregoing elements 2–6 are included in the tape recorder section of the apparatus 1. The other part of the apparatus is a receiver section 8. The tape recorder section controls include an Eject push button 10, a Rewind button 11, a Stop button 12, a Reproduction button 13, a Fast Forward button 14, and a Record button 15. These buttons control the standard modes of operation of a tape recorder.

The receiver section 8 includes a radio on-off switch 20, an antenna 21, a tuning knob 22, and a volume control knob 23. The apparatus has a speaker 24 on its front panel along with a dial 25 that has two pointers 26 and 27. The pointer 26 operates on the upper part of the dial 25 to indicate FM tuning of the receiver section 8 and the lower pointer 27 operates on the lower part of the dial 25 to indicate the tuning of the receiver section for AM stations.

Also located on the front panel of the apparatus 1 are a TV channel selector knob 28 and a band selection knob 29 that adjusts the apparatus to receive FM signals, AM signals or the audio signals from TV channels. The TV channel selected by the selector knob 28 is shown in a channel indicator window 30 adjacent the selector knob. Three other windows 31–33 adjacent the knob 29 indicate whether AM, FM or TV signals have been selected.

FIGS. 2–8 illustrate selector apparatus for selecting FM, AM or TV signals. This apparatus includes three positioning cam surfaces 35–37, which are best shown and identified in FIG. 5, and which correspond, respectively, to FM, AM and TV operation. A positioning lever 38 with a roller cam follower 39 at one end cooperates with the positioning cam surfaces 35–37.

These elements are part of a band selecting mechanism 40 illustrated in more complete form in FIGS. 2 and 3. The band selecting mechanism is actuated by a shaft 41 to which the band selector knob 29 of FIG. 1 is connected. A main cam 42 is rigidly attached to the shaft 41 to be rotated thereby and an idler cam 43 is journaled on the shaft 41. A generally T-shaped indicating member 46 has a slot 47 that fits over the shaft 41 so that the indicator member 46 can slide transversely with respect to the shaft 41. In the view in FIG. 2, the transverse direction of movement of the indicating member 46 with respect to the shaft 41 is vertical. The indicating member 46 includes a cover portion at the upper part of the cross-bar section of the T and three windows 49–51 in the lower part of the cross-bar section. The positioning lever 38 shown in FIG. 5 is also shown in FIG. 2 and includes an arm 52 with a notch near its end onto which a spring 53 is hooked to provide clockwise resilient bias to the positioning lever 38 to cause the roller follower 39 to engage the positioning cam surfaces on the main cam 42.

Up and down movement of the indicating member 46 is controlled by a pin 55 that engages the lower end of the indicating member 46 and is attached to a three-armed intermediate lever 56. The intermediate lever is spaced from the indicating member 46 so that it pivots in a region between the main portions of the main cam 42 and the idler cam 43. The pin 55 engages the idler cam 43 by being moved up by the lever 56 to either side of a pair of projections 57 and 58 on the idler cam 43 or into a recess 59 between these projections. The lever 56 has a second arm 60 and pivots on a pin 61 mounted on a chassis 62. This is the same pin about which the band selection lever 38 pivots.

A pin 63 at the end of the third arm of the lever 56 engages a record operating lever 64 by fitting into a slot 65 therein. The lever 56 is biased by a spring 66 connected to the arm 60 to urge the lever 56 clockwise and thereby urge the T-shaped indicating member 46 to its downward position shown in FIG. 2. The spring bias on the lever 56 also urges the record operating lever 64 counterclockwise on a pivot pin 67 on the chassis 62. The lever 64 has a pin 68 extending from its other end.

A swing plate 69 is provided to pivot the lever 64 by pressure applied to the pin 68 by way of an end 70 of the swing plate. The swing plate 69 is moved longitudinally by pressure applied to an operating bar 71 pivotally connected to the swing plate 69 by a pin 72. The bar 71 has an enlongated slot 73 that engages a pin 74 affixed to the chassis 62 to limit the extent of movement of the bar 71 and to allow it to move only longitudinally. The operating bar 71 is actuated by the Record push button 15, which applies pressure to move the bar 71 to the right when the push button 15 in FIG. 1 is depressed and to move it to the left when the push button 15 is released to spring back up to the position shown in FIG. 1. A radio operating plate 75, which is interlocked with the radio on-off switch 20 of FIG. 1 has an opening 76 through which the swing plate 69 extends. The plate 75 can move up and down, as indicated in FIG. 2, so as to place the end 70 of the swing plate 69 either at a position not to engage the pin 68 or in a position to engage the pin 68 when pressure is applied to the operating bar 71.

When the radio on-off lever 20 is moved to its "on" position, the radio operating plate 75 is placed in the position shown in FIG. 2 so that the swing plate 69 occupies the position shown in solid lines. When the radio on-off lever 20 in FIG. 1 is moved to the "off" position, the swing plate 69 is pivoted around the pin 72 to the position shown in broken lines in FIG. 2.

The cam 43, as shown in FIG. 2 and especially in FIG. 7, has a receptacle 81 in which a colored plate can be fitted. The cam 43 has a cylindrical section 82 that extends from the main plane of the cam away from the cam 42 and terminates in a radially outwardly extending flange 83 in which the receptacle 81 is located. Three tabs 84–86 are formed in the flange 83 adjacent the receptacle 81 to hold edge portions 87 and 88 of a colored plate 89. This colored plate is preferably sufficiently resilient to be held by pressure applied by the tabs 85 and 86.

Figure 6:
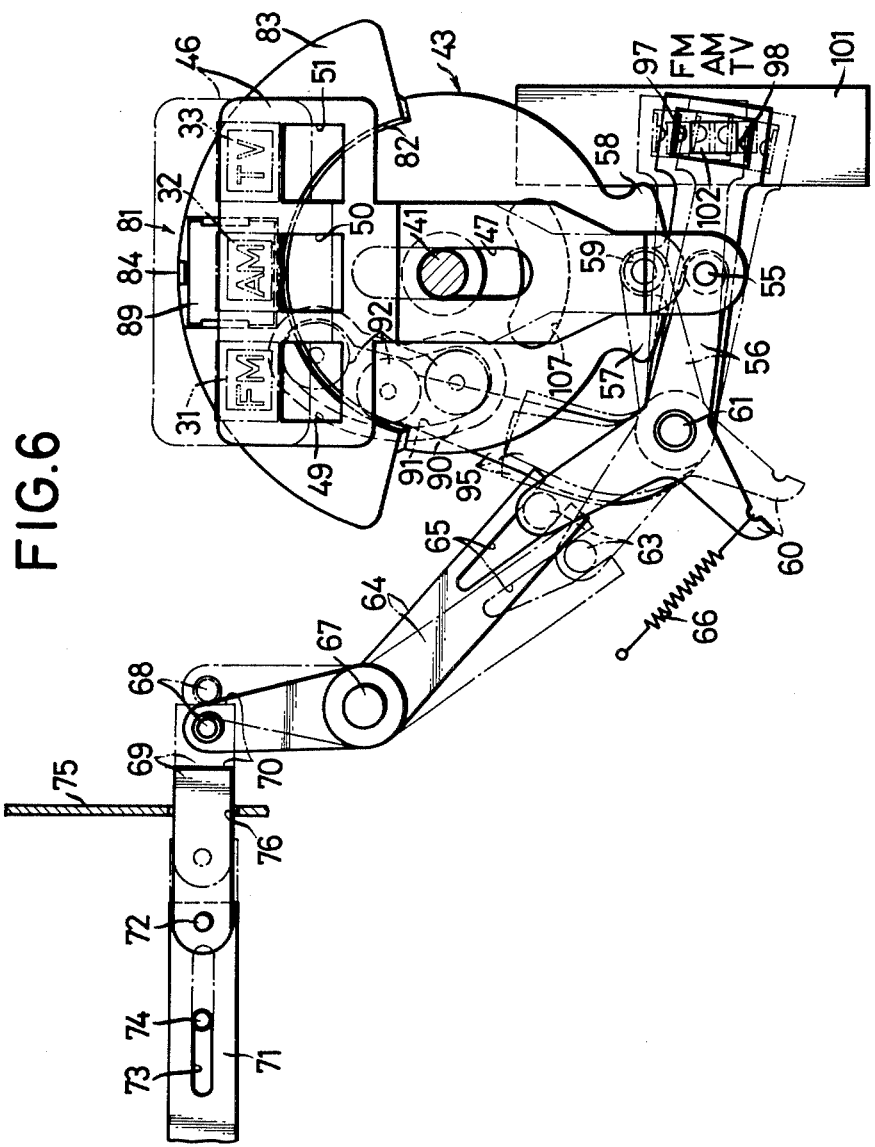
FIG. 6 is a front elevational view of an idler cam and several associated levers and other components shown in FIG. 2.

FIG. 6 shows a closed wall 90 in dotted lines because it is on the rear surface of the idler cam 43 facing the main cam 42. The inner surface 91 of the wall 90 forms a cam surface for a roller follower 92 rotatably supported on one end of an L-shaped switch operating lever 95. The lever 95 is pivotally supported on the same pin 61 as the levers 38 and 56, and it can be pivoted relative to the chassis 62, as illustrated by the position shown in solid lines and the two alternative positions shown in different broken lines. At the other end of the lever 95 from the follower 92 is a pair of arms 97 and 98, which are shown in FIG. 6 but are more clearly shown in FIGS. 2 and 4. These arms actuate a switch 101 by embracing a projecting member 102. The switch 101 has three operative positions. As indicated in FIG. 6, the uppermost operative position of the projection 102 is for FM operation of the apparatus 1 in FIG. 1, the middle position is for AM operation, and the lower position is for TV operation.

As shown particularly in FIG. 3, the idler cam 43 has a pin 105 projecting from its rear surface and engaging an arcuate slot 106 in the forwardly facing surface of the main cam 42. The idler cam 43 also has an arcuate slot 107 that receives a projecting pin 108 from the front surface of the main cam 42. The main cam has a central cylinrical section 110 that engages the shaft 41, and the relative positions of the pins 105 and 108 and the slots 106 and 107 are shown in the phantom views in FIGS. 8A–8C. The latter figures also show a spring 111 that has a coil section 112 loosely encircling the cylinder 110 and two legs 113 and 114 extending down alongside opposite sides of the pins 105 and 108.

Referring again to FIGS. 3 and 5, it will be seen that there are two walls 115 and 116 extending from the rear surface of the main cam 42. The inner surfaces 117 and 118, respectively, of the walls 115 and 116, serve as cam surfaces for two roller followers 119 and 120. A sliding plate 96 on which the roller follower 119 is mounted operates a second switch mechanism. The plate 96 has a projection 125 that fits into a slot 126 in the chassis 62. The permissible up and down movement of the plate 96 is best illustrated in FIG. 3, where it is shown in solid lines in its center position and in broken lines in its upper and lower positions. The plate 96 is held in place against the chassis 62 by a pair of arms 127 and 128 that have hooks at their ends. These arms are molded of the same insulating material as the chassis 62 and have sufficient resilience to receive the plate 96 and to hold it in place. Two arms 129 and 130 extend from the plate 96 and actuate a three position monitor changeover switch 131. As shown in FIG. 3, this switch has an upper position for FM operation, a center position for AM operation, and a lower position for TV operation. These positions correspond to the locations of an actuating member 132 of the switch 131.

FIGS. 2 and 3 show a clutch operating lever 134 of resilient material with the roller follower 120 rotatably mounted at its free end. The lever 134 is pivoted on a pin 135 and has, at its other end, a pin 136 that actuates a sliding operating plate 137 by engagement of the pin 136 with a slot 138 near the end of the plate 137. This is also shown in FIG. 5.

Figure 9:
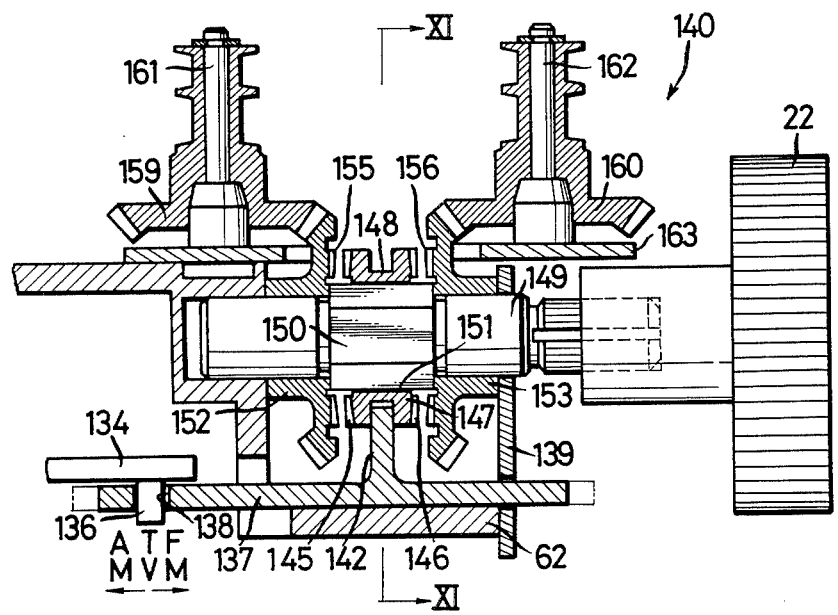
FIG. 9 is an enlarged cross-sectional view of part of the AM and FM tuning mechanism in the apparatus of FIG. 1.
Figure 10:
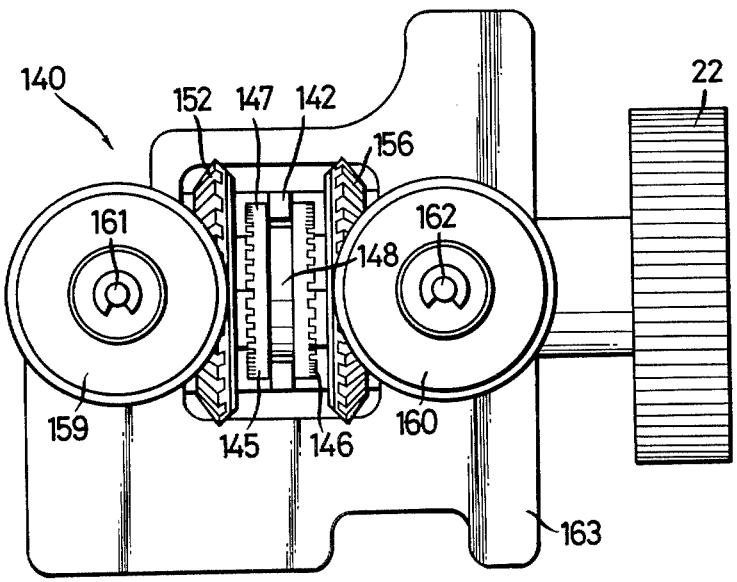
FIG. 10 is a plan view of the mechanism in FIG. 9.

FIGS. 9–11 show a clutch mechanism to connect the tuning knob 22, which is also shown in FIG. 1, to control either an AM tuner or an FM tuner. The tuners themselves are not shown in this figure. The apparatus in FIGS. 9 and 10 also includes means to connect the tuning knob 22 to actuate the pointers 26 and 27 on the FM and AM sections of the dial 25 in FIG. 1.

FIG. 9 shows the plate 137 slidably mounted in slots in the chassis 62 and in a mounting plate 139 attached to the chassis. The clutch mechanism is identified by Reference No. 140 and has a yoke 142 with a semi-circular cut-out 141 (FIG. 11) to actuate a clutch wheel 147 that has oppositely directed surfaces with serrations or teeth, 145 and 146. The yoke 142 fits into a groove 148 in the member 147. A tuning shaft 149 is provided with a polygonal section 150 on which the clutch wheel 147 is slidably mounted. The shaft 149 also has two cylindrical sections, one on each side of the hexgonal mounting section 150, and two bevel drive gears 152 and 153 are rotatably journaled on the cylindrical sections of the shaft 149. These gears have teeth 155 and 156 to engage the teeth 145 and 146, respectively, on the clutch wheel 147.

Two other bevel idler gears 159 and 160 rotatably mounted on shafts 161 and 162 on a mounting plate 163 are continuously engaged with the bevel gears 152 and 153, respectively, the bevel gears 159 and 160 are each provided with a pulley section at the end remote from the gear teeth, and in accordance with the standard practice, strings are wound around the pulleys to actuate the pointers 26 and 27 in FIG. 1.

Figure 12:
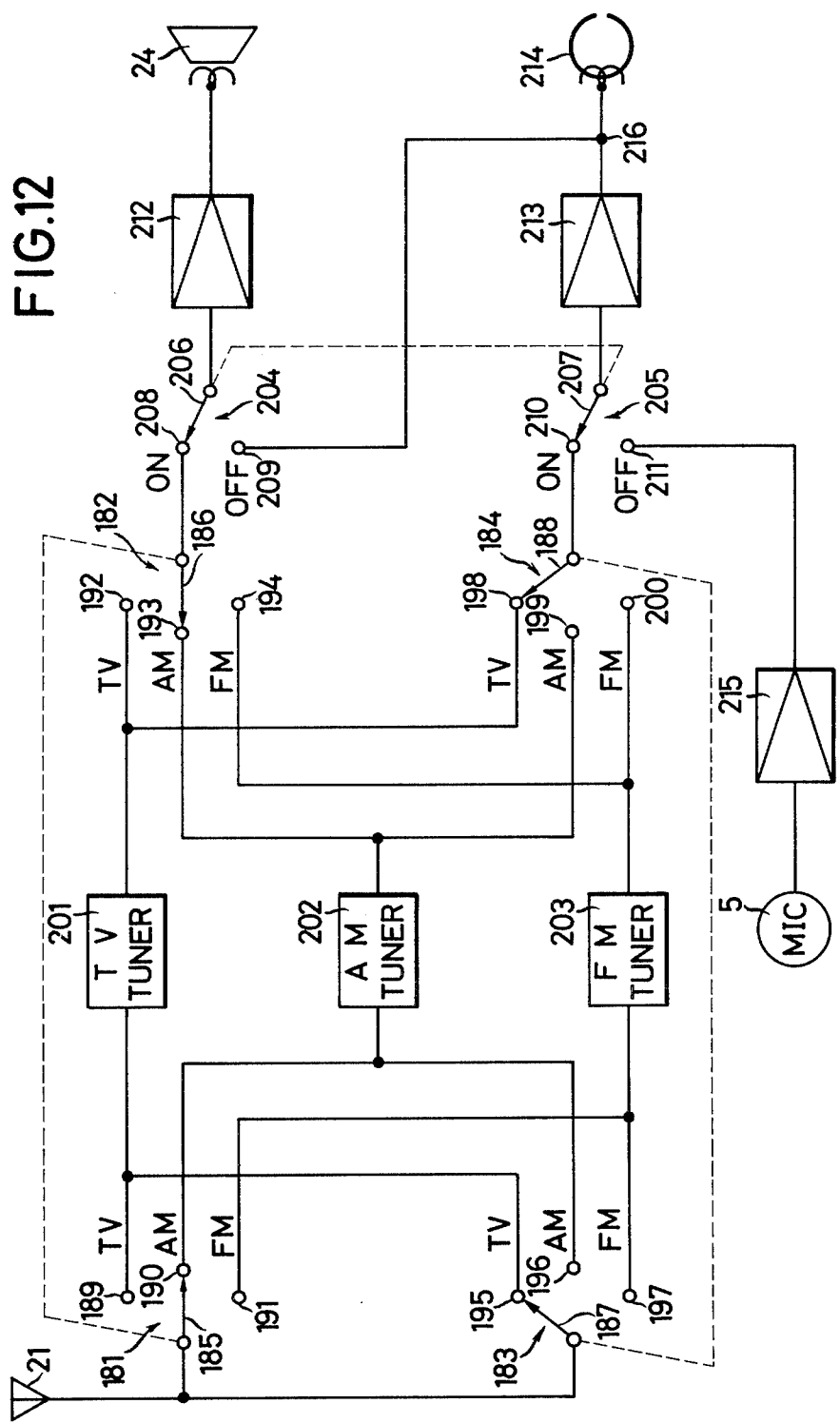
FIG. 12 is a block diagram of the apparatus in FIG. 1.

FIG. 12 shows a circuit suitable for use in the present embodiment of the invention. In this circuit the antenna 21 (FIG. 1) is connected to a monitor change-over switch 181 mechanically ganged with another switch 182. The antenna 21 is also connected to a recording change-over switch 183 that is mechanically ganged to a switch 184. The switches 181–184 have, respectively, movable arms 185–188. The switch 181 is interlocked with the monitor change-over switch 131 shown in FIGS. 2–4, while the switch 183 is interlocked with the record change-over switch 101 shown in FIGS. 2, 4 and 6.

The monitor change-over switch 181 includes stationary contacts 189, 190 and 191 corresponding to TV, AM and FM operation. The switch 182 has three corresponding fixed contacts 192–194 for the same three operating bands. In the same manner, the recording change-over switch 183 has three fixed contacts 195–197 and the switch 184 has three fixed contacts 198–200, also for the three operating bands. A TV tuner has its input terminal connected to the fixed terminals 189 and 195 and its output terminal connected to the fixed terminals 192 and 198. An AM tuner 202 has its input terminal connected to the fixed terminals 190 and 196 and its output terminal connected to the fixed terminals 193 and 199. An FM tuner 203 has its input terminal connected to the fixed terminals 191 and 197 and its output terminal connected to the fixed terminals 194 and 200.

The radio on-off switch 20 of FIG. 1 is connected to a pair of ganged switches 204 and 205 that have movable arms 206 and 207, respectively. The switch 204 also has a pair of fixed terminals 208 and 209 identified, respectively, as the "on" and "off" terminals according to the marking of the switch 20 in FIG. 1. In a similar manner the switch 205 has two fixed terminals 210 and 211, which are also marked, respectively, "on" and "off". The arm 206 of the switch 204 is connected to the input of an amplifier 212 that supplies signals to the loudspeaker 24. The arm 207 of the switch 205 is connected to the input of an amplifier 213 that supplies signals to a recording and playback transducer 214. The microphone 5 is connected to the input of an amplifier 215 that has its output terminal connected to the terminal 211 of the switch 205, and the terminal 209 of the switch 204 is connected to a common connection point 216 between the output of the amplifier 213 and the transducer 214.

The operation of the apparatus in FIGS. 1–12 will now be described. Initially it will be assumed that the radio on-off switch 20 in FIG. 1 is in its "off" position. As shown in FIG. 12, this connects the transducer 214 by way of the common connection point 216 and the terminal 209 of the switch 204, to the input of the amplifier 212 so that sound picked up from the magnetic tape in the cassette 2 can be reproduced by the speaker 24. The output terminal of the microphone amplifier 215 is connected by way of the terminal 211 and the movable contact 207 of the switch 205 to the input terminal of the recording amplifier 213. This allows signals from the microphone 5 to be recorded on the magnetic tape of the cassette 2 in FIG. 1, and these signals can be reproduced by the speaker 24 by suitable, standard operation of the push buttons 11–15 of the tape recorder section 7 in FIG. 1.

When switch 20 in FIG. 1 is placed in its "on" position, power is supplied to the radio receiver section 8 of the apparatus 1 and the contacts 206 and 207 are switched over to the terminals 208 and 210 respectively, as shown in FIG. 12. In that condition any one of the FM, AM or TV signals can be monitored by the speaker 24 in accordance with the operation of the monitor change-over switch 103 shown in FIGS. 3 and 4. Furthermore, any one of the FM, AM or TV signals could be recorded on the magnetic tape of the casssette 2 (FIG. 1) by the transducer 214 in FIG. 12 in accordance with the actuation of the record change-over switch 101 as shown in FIGS. 2 and 4, and provided the tape recorder section 7 is put into its recording mode.

In the circuit shown in FIG. 12, signals picked up by the antenna 21 are applied by way of the movable contact 185 to one of the three terminals 189–191. As shown, the arm 185 happens to be connected to the terminal 190 leading to the AM tuner 202. The movable arm 187 also happens to be in position to connect the antenna 21 to the fixed contact 196, which is connected to the input of the AM tuner 202. However, as will be described in greater detail hereinafter, even if the movable arm 187 were held in the position shown, the movable arm 185 could be moved to make connection with either of the other fixed contacts 189 or 191 to direct an input signal to the TV tuner 201 or to the FM tuner 203.

The output signal of the AM tuner 202 is connected through the fixed contact 193 and the movable arm 186 of the switch 182 to the fixed contact 208 and the movable arm of the switch 204. The latter is connected to the amplifier 212 so that the output signal of the AM tuner 202 is applied to the speaker 24 to be monitored by a listener. The fact that the switches 181 and 182 are ganged together makes it automatic that when the signal from the antenna 21 is applied to any one of the tuners 201–203 by way of the switch 181, the output signal from the tuner will be carried by the switch 182 to the switch 204 and on to the speaker 24.

The output terminal of the AM tuner 202 is also connected to the fixed terminal 199 of the switch 184, and the received AM signal passes through the switch 184 to the switch 205 and from there through the amplifier 213 to the transducer 214. If the Record button 15 in FIG. 1 is depressed, the signal from the AM tuner 202 will be recorded on the tape in the cassette.

The ganged switches 183 and 184 are separate from the ganged switches 181 and 182 and thus, electrically, it is possible for the movable arm 187 of the switch 183 and the movable arm 188 of the switch 184 to be set for TV operation or FM operation as well as for AM operation. This means that one signal, in the present example the AM signal, can be amplified by the tuner 202 and monitored on the speaker 24, while the TV signals or the FM signal can simultaneously be recorded by the transducer 214 on tape in the cassette 2. However, signals from the TV tuner 201 cannot be monitored at the same time that signals from the FM tuner 203 are being recorded, and vice-versa, because the simultaneous recording of the FM (or TV) signal and monitoring of the TV (or FM) signal would create interference within the circuits.

The operation of the band selecting mechanism 40 will now be described with reference to FIGS. 1–8C to clarify the selective relationship between monitoring and recording of the different signals.

A signal band to be recorded is selected by setting the knob 29 to the FM, AM or TV band. Rotation of the knob 29 causes the band selecting shaft 41 to rotate and thus to rotate the main cam 42. As will be observed particularly in FIG. 5, the lever 38 and the roller 39, together with the spring 53, operate as a detent mechanism to allow the cam 42 to be moved to only three setting positions corresponding to one of the cam surfaces 35–37. It happens that in FIG. 5 the roller 39 is engaging the cam surface 36 for AM operation.

The cam 43 is rotated by means of the main cam 42 and the linkage between the cams 42 and 43 effected by the pins 105 and 108 (FIG. 8A) and the spring 111. Rotation of the main cam 42 causes the pin 108 to move. The legs 113 and 114 of the spring 111 exert sufficient force against the pins 105 and 108 so that the pin 105 is normally carried along with the pin 108 when the latter is rotated. Since the pin 105 is an integral part of the idler cam 43, the idler cam is thus carried along with the main cam 42.

When the idler cam 43 is rotated, the colored plate 89 shown in FIG. 6 and mounted on the flange 83 moves to a position directly above the corresponding one of the FM, AM or TV indicating openings 49–51. In FIG. 6 the colored plate 89 is shown above the AM indicating opening 50 in the indicating member 46. The roller 92 is controlled by the cam surface 91 to cause the lever 95 to take a position corresponding to the selected band, which in this example is the AM band. Accordingly, the switch actuator 102 is moved to its central position, corresponding to AM operation, by means of the arms 97 and 98 on the lever 95. The cam surface is so shaped that the roller 92 is moved farther from the axis of the shaft 41 as the idler cam 43 moves from its TV setting position to its AM setting position and still farther when the cam 43 moves to its FM setting position.

With the foregoing rotation of the main cam 42 that produces rotation of the idler cam 43, the roller follower 119 attached to the switch operating member 96 is also moved by the cam surface 117. The actual layout of the cam surface 117 is best shown in FIG. 5, and the cam surface is arranged to move the roller 119 radially with respect to the shaft 41 as the cam 42 is rotated. As shown in FIG. 5 and also in FIG. 3, the follower 119 is closest to the axis of the shaft 41 when the cam 42 is in its FM position and farthest from the axis of the shaft 41 when the cam 42 is in its TV position. The controlled movement of the roller 119 actuates the monitor change-over switch 131 to the corresponding FM, AM or TV band.

Rotation of the shaft 41 and the cam 42 also controls the movement of the roller follower 120, as shown in FIG. 5. The cam surface 118 that controls the movement of the roller follower 120 is different from the cam surface 117 in that the roller follower 120 is closest to the axis of the shaft 41 when the cam 42 is in its AM setting position and is farthest from the axis of the shaft 41 when the cam 42 is in its FM setting position. When the cam 42 is in its TV setting position, the roller 120 is at an intermediate position radially relative to the axis of the shaft 41. Thus the sliding operating plate 137 is farthest to the left when the cam 42 is in its AM setting position and farthest to the right when the cam 42 is in its FM setting position and is in an intermediate position when the cam 42 is in its TV setting position.

The effect of the operating plate 137 on the clutch mechanism 140 is illustrated in FIG. 9. When the operating plate 137 is farthest to the left, the yoke 142 brings the clutch wheel 147 into engagement with the bevel gear 152 so that rotation of the tuning knob 22 will rotate the bevel gear 159 and effect tuning operation of the AM receiver in the apparatus 1 in FIG. 1 and will simultaneously move the pointer 27 by a dial cord (not shown). On the other hand, when the plate 137 is farthest to the right, the yoke 142 forces the clutch wheel 147 into engagement with the bevel gear 153 so that rotation of the tuning knob 22 will cause rotation of the bevel gear 160 and effect tuning operation of the FM receiver portion of the apparatus 1 in FIG. 1 and will simultaneously move the pointer 27 by another dial cord (not shown).

When the plate 137 is in its intermediate position corresponding to the setting of the cam 42 in FIG. 5 to its TV setting position, the clutch wheel 147 will not engage either of the bevel gears 152 or 153. Rotation of the knob 22 will not change the tuning of either the AM receiver or FM receiver in the apparatus of FIG. 1 unless the clutch wheel 147 in FIG. 9 engages the appropriate bevel gear 152 or 153. On the other hand, when the clutch wheel 147 does engage one of the bevel gears 152 or 153, not only will the appropriate tuning of one of the receivers take place, but the corresponding pointer 26 or 27 will also be moved relative to the dial 25. The unaffected tuner, and its pointer will remain stationary so that the user will always know the last setting of both the AM and FM receiver tuners in the apparatus 1 in FIG. 1. The last setting of the TV tuner is indicated by the TV channel number appearing in the window 30 in FIG. 1. Furthermore, as shown in FIG. 1, the selected FM, AM or TV band is indicated by the alignment of the ridge portion 44 of the band selecting knob 29 with one of the indicating windows 31–33.

When the audio signal from one of the bands is to be recorded in the recorder portion 7 in FIG. 1, the radio portion 8 must be set to receive the proper signal by turning the selector knob 29 to the desired band and adjusting the tuning either by means of the knob 22 for FM or AM signals or by turning the knob 28 to choose the desired TV channel, if that is the signal to be recorded. It is also necessary to place the radio on-off switch 20 in its "on" position. This causes the plate 75 in FIG. 2 to move to its lower position and allow the swing plate 69 to assume the position shown in solid lines. This places the end 70 directly in line with the pin 68 so that when the Record button 15 in FIG. 1 is depressed, the swing plate 69 will push the end 70 and the pin 68 to the right from their respective positions shown in FIG. 2. This causes the lever 64 to pivot clockwise, and the engagement between the pin 63 and the slot 65 causes the lever 56 to pivot counterclockwise.

The pin 55 extending from the lever 56 thereupon pushes the indicating member 46 upwardly and moves the pin 55 into engagement with the idler cam 43 in whichever position that cam has been placed. If the idler cam 43 is in its AM setting position, which is the position illustrated in FIG. 2, the pin 55 will move up into the recess 59 between the projections 57 and 58. If the idler cam 43 is in its FM setting position, the pin 55 will move up alongside the outer edge of the projection 57. If the idler cam 43 is in its TV setting position, the pin 55 will move up alongside the outer edge of the projection 58. In any of the three cases, the idler cam 43 will be locked against further movement in response to rotation of the shaft 41. In the case of the FM and TV positions, engagement of the roller follower 92 with the ends of the closed wall 90 will determine the limits of rotation of the cam 43.

When the idler cam 43 is locked in one of its three possible setting positions, the lever 95 will also be locked in the corresponding position and will set the actuator 102 of the switch 101 to the appropriate position. This will lock the switches 183 and 184 to connect the selected one of the tuners 201–203 to the switch 205 and from there through the amplifier 213 to the transducer 214 to record signals from the selected band on the cassette 2 in FIG. 1.

Upward movement of the indicating member 46 causes the appropriate opening 49–51 to expose the colored plate 89 in FIG. 6. Thus the operator will be able to tell which of the bands is being recorded.

As long as the Record push button 15 in FIG. 1 remains depressed, the audio signal from the selected band will continue to be recorded on the cassette 2. If it is desired to listen to a signal on another band while the recording is going on, the selector knob 29 can be shifted to a different position corresponding to that other band. However, there are limitations in the permissible movement of the selector knob 29, corresponding to the fact that this invention prohibits the simultaneous recording of a TV signal and monitoring of an FM signal or vice-versa.

FIG. 3 shows the pin 105 extending from the idler cam 43 and the pin 108 extending from the main cam 42. The main cam has a recess 106 defined by a surface portion into which the pin 105 extends. Similarly, the idler cam 43 has a recess defined by a surface portion, and the pin 108 extends into the latter recess. These recesses are also shown in FIG. 7 and 8A–8C as arcuate slots. When the initial band selection is made with the band selector knob 29, rotation of the shaft 41 and of the cam 42 affixed to the shaft causes the pin 108 to shift to one of the three setting positions for TV, AM or FM operation. The coil 112 of the spring 111 is wrapped around the cylindrical section 110 and the spring legs 113 and 114 extend alongside the two pins 108 and 105. The resilient force of the legs 113 and 114 is such that, when the cam 42 moves the pin 108, the pin 105 is pulled along with it. This is the transmission mechanism by which rotational force on the shaft 41 and the cam 42 effects rotation of the idler cam 43.

Figure 8A:
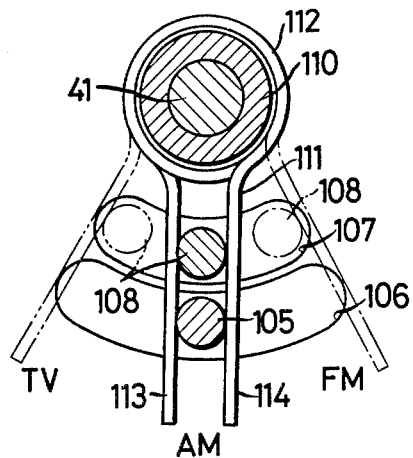
FIGS. 8A–8C are enlarged phantom views of the coil spring and certain interconnected parts of the apparatus in FIG. 2 illustrating different modes of operation of the spring.

However, when the idler cam 43 is locked into any one of its three position by depression of the Record push button 15 of FIG. 1, the pin 105 is held in the corresponding setting position. In FIG. 8A both of the pins 105 and 108 are shown in their AM setting position and thus the corresponding cams 43 and 42 are both in their AM setting positions. As shown in broken lines in that figure, it is still possible to rotate the shaft 41 and the cam 42 to either of the other setting positions for monitoring TV of FM signals. The resilient force applied by the legs 113 and 114 of the spring 111 is not so high as to hold the pins 108 and 105 in direct alignment. Furthermore, the detent operation of the lever 38 and the roller 39 in FIG. 5 with respect to the three holding surface portions 35–37 allows the cam 42 to remain in any of its three setting positions in spite of any restoring force applied to the pin 108 by the legs 113 and 114.

When the cam 42 is shifted, the roller follower 119 in FIGS. 3 and 5 moves the plate 96 and sets the switch 131 accordingly. Signals can then pass through the switch 181 in FIG. 12 to any of the tuners 201–203 and from that selected tuner through the switch 182 and the amplifier 212 to the speaker 24 to be monitored.

Figure 8B:
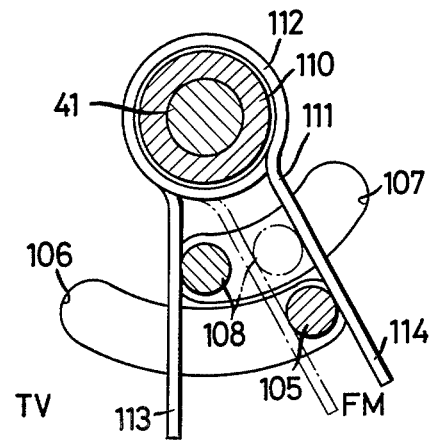

When the selector knob 29 is initially set to the FM position, and before the Record push button 15 in FIG. 1 is depressed, both of the cams 42 and 43, along with their respective pins 108 and 105 and slots 106 and 107 will move together. If the Record push button 15 is then depressed, the cam 43, pin 105 and slot 107 will be locked in place, as before. If the user then desires to monitor a different band, the selector knob 29 may be turned, but only in one direction and only to the next adjacent setting position as shown in FIG. 8B. Rotation of the shaft 41 from the FM setting position to the AM setting position will bring the pin 108 to one end of the arcuate slot 107 and the pin 105 to one end of the slot 106. The slot 107 is locked by the pin 55 in FIG. 3 and so the pin 108 cannot move any further. Of course, the shaft 41 could not be rotated in the other direction because, as will be noted in FIG. 5, a vertical wall at the edge of the recessed surface portion 35 would prevent counterclockwise rotation of the main cam 42 beyond the FM position. The wall 115 would also prevent such rotation of the cam 42 because of interference between the roller follower 19 and the end of the wall 115. The limited movement of the cam 42 makes it impossible to turn the knob 29 far enough to permit the movable arms 185 and 186 in FIG. 12 to reach the fixed terminals 189 and 192 as long as the movable arms 187 and 188 are in contact with the fixed terminals 197 and 200 and thus makes it impossible to monitor the audio portion of a TV signal if the apparatus 1 in FIG. 1 is set to record an FM signal.

Figure 8C:
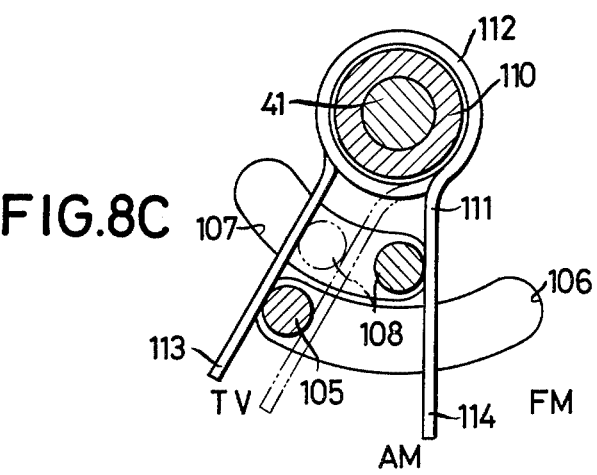

FIG. 8C shows the converse position in which the knob 29 in FIG. 1 is first moved to the TV setting position before the Record push button is depressed. The pins 105 and 108 would thus be moved correspondingly to their respective TV setting positions and the arcuate slots 106 and 107 would likewise be moved to their TV setting positions. Depression of the Record push button 15 in FIG. 1 would then lock the idler cam 43 with its arcuate slot 107 and its pin 105 in the position shown in FIG. 8C. It would still be possible to turn the selecting knob 29 in FIG. 1 to the AM setting position, thereby moving the cam 42 and its pin 108 and slot 106 to the position shown in FIG. 8C, but the pins 105 and 108 would then be against opposite ends of the arcuate slots 106 and 107, and the knob 29 could not be rotated further in the counterclockwise direction. Thus, an AM signal could be monitored while the audio portion of a TV signal was being recorded, but the switches 181 and 182 in FIG. 12 could not be set to monitor an FM signal.

While there has been described one preferred embodiment of the invention, modifications and variations therein are possible in the light of the above teachings. It is therefore to be understood that the invention may be practiced otherwise than as specifically described without departing from the true scope as defined by the claims.

What is claimed is:

1. A combination comprising:
   A. magnetic recording apparatus;
   B. a first receiving means to receive electromagnetic wave signals in a first band of frequencies and to produce therefrom a first audio signal;
   C. second receiving means to receive electromagnetic signals in a second band and to produce therefrom a second audio signal;
   D. third receiving means to receive electromagnetic signals in a third band and to produce therefrom a third audio signal;
   E. audio signal monitoring means;
   F. first selecting means to connect either of said audio signals, selectively, to said recording apparatus to record the selected audio signal;
   G. second selecting means to connect either of said audio signals, selectively, to said monitoring means; and
   H. mechanical interlocking means to prevent either of said audio signals from being connected to said recording apparatus while the other of said audio signals is connected to said monitoring means, said first selecting means selectively connecting any of said audio signals to said recording apparatus, said second selecting means selectively connecting any of said audio signals to said monitoring means, and said mechanical interlocking means selectively connecting either of said first or second audio signals to said recording apparatus while said third audio signal is connected to said monitoring means, or selectively connecting either of said first or second audio signals to said monitoring means while said third audio signal is connected to said recording apparatus.

2. The invention as defined in claim 1 in which said mechanical interlocking means comprises:
   A. band selecting means settable to selected setting positions according to a selected one of said bands;
   B. control means settable to selected setting positions corresponding to said setting positions of said band selecting means;
   C. transmission means connecting said band selecting means to said control means to cause said control means to move in step with said band selecting means, said transmission means comprising a resilient member permitting limited freedom of separate movement between said band selecting means and said control means and resiliently urging said control means to a setting position corresponding to the setting position of said band selecting means; and
   D. locking means actuable to engage said control means and retain said control means in any of its setting positions while said band selecting means is movable between the corresponding setting position and an adjacent setting position.

3. The invention as defined in claim 2 in which said band selecting means comprises a main cam, said control means comprises an idler cam, and said transmission means comprises stop means cooperating with said resilient member to limit movement of said idler cam relative to said main cam.

4. The invention as defined in claim 3 in which said transmission means comprises:
   A. a first surface portion of said main cam defining a first open space of limited extent;
   B. a second surface portion of said idler cam defining a second open space of limited extent;
   C. a projection extending from said main cam into said open space defined by said surface portion of said idler cam;
   D. a second projection extending from said idler cam into said open space defined by said surface portion of said main cam, said resilient member linking said projections together to have a predetermined spatial relationship to each other.

5. The invention as defined in claim 3 in which both of said cams are coaxially mounted for pivotal movement over three equally arcuately displaced setting positions, said first surface portion comprises a wall defining a first arcuate slot, and said second surface portion comprises a wall defining a second arcuate slot on said idler cam, the arcuate extent of each of said slots being substantially equal to the arcuate movement of each of said cams in moving through said range of setting positions.

6. The invention as defined in claim 5 in which said stop means comprises the ends of said arcuate slots.

7. The invention as defined in claim 2 in which said band selecting means has three equally spaced setting positions and further comprises detent means with three positions corresponding to said three setting positions, said control means has three setting positions equally spaced apart and spaced corresponding to the spacing between the setting positions of said band selecting means, and said locking means comprises means actuable by said magnetic recording apparatus to engage said control means when any of said audio signals is being recorded.

8. The invention as defined in claim 2 in which said magnetic recording apparatus comprises a Record control to place said magnetic recording apparatus in its Record mode, and said invention comprises means connecting said Record control to said locking means to actuate the latter when said magnetic recording apparatus is in its Record mode.

9. The invention as defined in claim 8 comprising on-off means to energize said receiving means, said means connecting said Record control and said locking means comprising a sliding member and means connected to said on-off means to deflect said sliding member from engaging said locking means except when said on-off means is in position to make at least one of said receiving means operative.

10. The invention as defined in claim 2 in which said control means comprises stop edges and said locking means comprises a member movable into engagement with said stop edges according to the position of said control means when said locking means is actuated.

11. The invention as defined in claim 10 in which said control means comprises first and second projections extending toward said locking means and said stop edges comprise opposite edges of said first and second projections, and said locking means comprises a pin movable into contact with said stop edges to prevent movement of said control means.

12. The invention as defined in claim 2 comprising:
A. means to actuate said locking means to engage said control means when said magnetic recording apparatus is placed in its Record mode;
B. first indicia means cooperating with said band selecting means to indicate which of said receiving means is connected to supply audio signals to said monitoring means; and
C. second indicia means connected to said locking means to indicate which of said receiving means is connected to supply audio signals to said recording apparatus.

13. The invention as defined in claim 2 in which said first receiving means comprises an FM tuner tunable over an FM band, said second receiving means comprises a TV tuner tunable over a plurality of TV channels in a TV band, and said third receiving means comprises an AM tuner tunable over an AM frequency band, and said band selecting means is settable to three equally spaced setting positions, the center one of said setting positions effecting connection of signals through said AM tuner to said monitoring means.

14. The invention as defined in claim 13 in which said control means is settable to three equally spaced setting positions, the center one of said setting positions of said control means effecting connection of said signals through said AM tuner to said recording apparatus.

15. The invention as defined in claim 1 in which said first receiving means comprises an FM tuner tunable over an FM band, said second receiving means comprises a TV tuner tunable over a plurality of TV channels in a TV band, and said third receiving means comprises an AM tuner tunable over an AM frequency band, and said invention further comprises:
A. a tuning knob;
B. first and second driving means to effect, respectively, tuning of said FM and AM tuners;
C. clutch means to connect said tuning knob alternatively to said first or second driving means; and
D. means connecting said mechanical interlocking means to said clutch means to actuate said clutch means according to operation of said second selecting means to select audio signals from either said FM band or said AM band to be monitored.

16. The invention as defined in claim 15 in which said means connecting said mechanical interlocking means to said clutch means comprises means to move said clutch means to an intermediate position to disconnect said tuning knob from either of said driving means when said second selecting means connects said TV tuner to supply audio signals from said TV band to said monitoring means.

17. The invention as defined in claim 1 in which said first selecting means comprises first electrical switching means to control the passage of signals through any one of said receiving means and from said receiving means to said recording apparatus, and said second selecting means comprises second electrical switching means to control the passage of signals through any one of said receiving means and from said receiving means to said monitoring means.

18. The invention as defined in claim 17 comprising an antenna, and said first electrical switching means comprises:
A. a first switch to connect said antenna, selectively, to any of said receiving means; and
B. a second switch to connect output terminals of any of said receiving means, selectively, to said recording apparatus, said first and second switches being ganged to connect to the same receiving means at all times.

19. The invention as defined in claim 18 comprising an on-off switch having:
A. a movable arm connected to said recording apparatus; and
B. a fixed terminal connected to said second switch to receive signals therefrom.

20. The invention as defined in claim 18 comprising:
A. a third switch to connect said antenna to any of said receiving means; and
B. a fourth switch to connect output terminals of any of said receiving means, selectively, to said monitoring means.

21. The invention as defined in claim 20 comprising an on-off switch having:
A. a first movable arm connected to said recording apparatus;
B. a first fixed terminal engageable by said first movable arm and connected to said second switch to receive signals therefrom;
C. a second movable arm connected to said monitoring means; and
D. a second fixed contact engageable by said second movable arm and connected to said fourth switch to receive signals therefrom, said movable arms of said on-off switch being ganged to engage said respective fixed terminals when said receiving means are energized.

22. A combination device comprising:
A. magnetic recording apparatus;
B. at least first and second receiving means for receiving signals in first and second signal bands, respectively;
C. signal band selecting means connecting one of said at least first and second receiving means to said recording apparatus for recording said signals in the corresponding one of said signal bands; and
D. interlocking means for preventing said signal band selecting means from connecting another of said receiving means to said recording apparatus during the recording of said signals in said one signal band.

23. The combination device as defined in claim 22 in which said interlocking means comprises control means connected to said signal band selecting means for setting positions corresponding to said signal bands, and engaging means actuable for engaging said control means and retaining said control means in one of said setting positions according to said one band connected for recording.

24. The combination device as defined in claim 23 in which said magnetic recording apparatus further comprises record controlling means for effecting a recording mode and said interlocking means further comprises connection means connecting said engaging means to said record controlling means in said magnetic recording apparatus for actuating said engaging means when said magnetic recording apparatus is in said recording mode.

25. The combination device as defined in claim 23 in which said control means comprises a cam having stop edges on opposite edges of projections, said projections being formed at the circumference of said cam, and said engaging means comprises a locking pin movable into engagement with said stop edges according to said setting position of said one band connected to said magnetic recording apparatus for recording.

* * * * *